(12) United States Patent
Izard et al.

(10) Patent No.: US 12,476,866 B2
(45) Date of Patent: Nov. 18, 2025

(54) AUTOMATED CONFIGURATION OF FILTERS TO MONITOR PRODUCTION NETWORK TRAFFIC

(71) Applicant: Arista Networks, Inc., Santa Clara, CA (US)

(72) Inventors: Ryan Izard, Seneca, SC (US); May Louie, Burnaby (CA); Arup Raton Roy, Burnaby (CA); Junaid Zulfiqar, Pleasanton, CA (US)

(73) Assignee: ARISTA NETWORKS, INC., Santa Clara, CA (US)

( * ) Notice: Subject to any disclaimer, the term of this patent is extended or adjusted under 35 U.S.C. 154(b) by 118 days.

(21) Appl. No.: 18/454,987

(22) Filed: Aug. 24, 2023

(65) Prior Publication Data

US 2025/0071018 A1 Feb. 27, 2025

(51) Int. Cl.
*H04L 41/08* (2022.01)
*H04L 43/028* (2022.01)

(52) U.S. Cl.
CPC ............ *H04L 41/08* (2013.01); *H04L 43/028* (2013.01)

(58) Field of Classification Search
CPC .............................. H04L 41/08; H04L 43/028
See application file for complete search history.

(56) References Cited

U.S. PATENT DOCUMENTS

| | | | |
|---|---|---|---|
| 7,418,490 B1* | 8/2008 | Zhang | H04L 67/51 709/224 |
| 2016/0248860 A1* | 8/2016 | Dunbar | H04L 67/146 |
| 2017/0099182 A1* | 4/2017 | DeBolle | H04L 41/12 |
| 2020/0174993 A1* | 6/2020 | Wood | H04L 41/0866 |
| 2021/0119871 A1* | 4/2021 | Page | H04L 67/51 |
| 2023/0112579 A1* | 4/2023 | Parenti | H04L 41/0894 709/220 |
| 2024/0406112 A1* | 12/2024 | Parenti | H04L 63/205 |
| 2025/0071018 A1* | 2/2025 | Izard | H04L 41/0894 |

* cited by examiner

*Primary Examiner* — Jerry B Dennison
(74) *Attorney, Agent, or Firm* — Fountainhead Law Group, PC

(57) ABSTRACT

The disclosure relates to automating a balanced configuration of traffic monitoring filters to monitor traffic in a production network. A deployment in accordance with the disclosure includes a production network and a monitoring fabric. The production network includes a network controller to configure and provide information about the production network, and likewise the monitoring fabric includes a controller to configure and provide information about the monitoring fabric. A filter agent can create traffic monitoring rules that constitute user-defined traffic monitoring filters, and deploy the rules in a balanced fashion across devices in the production network and in the monitoring fabric using information queried from the production network controller and the monitoring fabric controller. The filter agent can redeploy traffic monitoring rules in response to changes in the operating environment.

20 Claims, 7 Drawing Sheets

AUTOMATED CONFIGURATION OF FILTERS TO MONITOR PRODUCTION NETWORK TRAFFIC

BACKGROUND

Operators in a production network, such as network administrators, use monitoring tools to gain visibility into the data flows in the network to maintain a healthy network. Knowledge of data flows facilitate troubleshooting network and application performance issues, provide insight into potential security concerns, and so on. Monitoring tools include out-of-band solutions (e.g., switch port analyzers, SPANs) to filter, aggregate, and analyze data flows. Production network operators can configure monitoring sessions on production switches to capture and send data flows to a monitoring solution; e.g., using SPAN, GRE (Generic Routing Encapsulation) tunnels, etc.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

The present disclosure relates to automating a balanced configuration of filters to monitor traffic in a production network. A deployment in accordance with the present disclosure can include a production network and a monitoring fabric such as a network packet broker (NPB). The production network can include a production network controller that can configure the devices in the production network and provide information about capabilities, configuration, and topology of the production network. For discussion purposes, the CloudVision® network management platform developed and sold/licensed by Arista Networks, Inc. of Santa Clara, California will be used as an example. The monitoring fabric can include a monitoring fabric controller that manages/configures the monitoring fabric. For discussion purposes, Arista Networks' Data Analyzer (DANZ) Monitoring Fabric (DMF) controller will be used as an example.

The present disclosure can be embodied in a process that, in various embodiments, can run on the production network controller or on the monitoring fabric controller, or is a process that runs on a standalone system separate from the production network and monitoring fabric controllers. A user can specify the traffic they want to monitor. The process can query or otherwise access information from the production network controller to identify a network device in the production network to capture the user-specified traffic and send that traffic to the monitoring fabric. The process can use criteria such as permissions, device capability, availability of HW resources (e.g., TCAM utilization), existing rules, traffic load, etc. to select the network device. In some instances, where programming such filters in the network device is not suitable or otherwise possible, the process can program the rules at the fabric edge devices (e.g., filter switches, filter nodes) of the monitoring fabric.

In the following description, for purposes of explanation, numerous examples and specific details are set forth in order to provide a thorough understanding of embodiments of the present disclosure. Particular embodiments as expressed in the claims may include some or all of the features in these examples, alone or in combination with other features described below, and may further include modifications and equivalents of the features and concepts described herein.

Figure 1A:
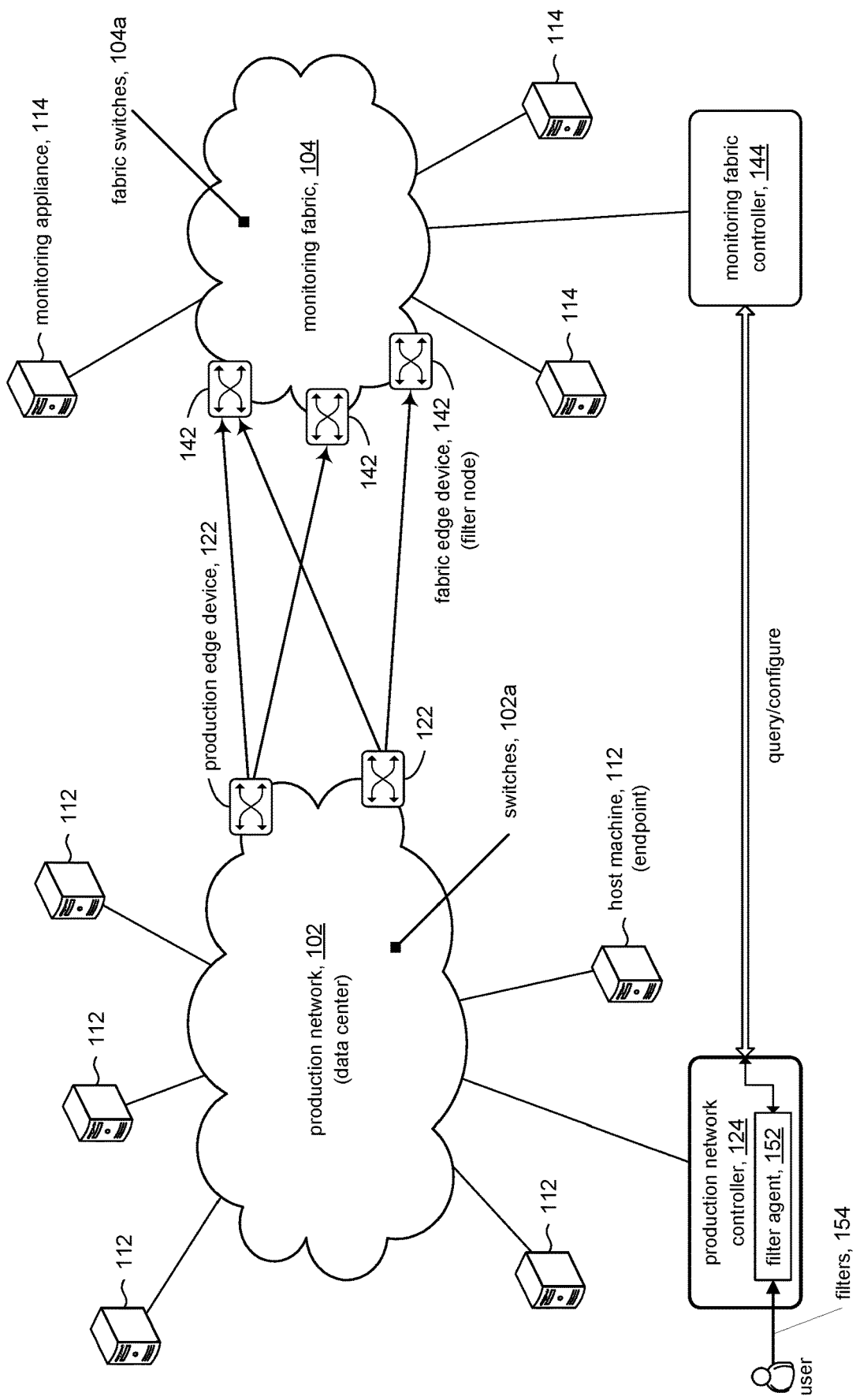
FIGS. 1A, 1B, and 1C show configurations for a filter agent in accordance with various embodiments.

FIG. 1A is a high level diagram illustrating a network deployment that can embody the techniques in accordance with the present disclosure. In some embodiments, the network deployment can comprise a production network (data center) 102 and a monitoring fabric 104. The production network 102 can comprise host machines (endpoints) 112, such as user computers, servers, database systems, and so on, which are traffic sources and traffic destinations. The production network 102 can comprise network switches 102a configured according to any suitable architecture; in some embodiments, for instance, the production network can be based on a leaf-spine architecture. Production edge devices 122 generally serve as gateways for traffic flowing out of the production network and for traffic entering the production network. Edge devices 122 show connections to monitoring fabric 104 to send traffic captured in the production network to the monitoring fabric. Although not shown in the figures, it will be understood that production network 102 includes edge devices for connecting to networks other than the monitoring fabric.

Network devices in the production network can be configured to capture network traffic for monitoring/troubleshooting. For example, switches can be configured with SPAN (Switched Port Analyzers) ports or TAP (test access point) ports to mirror, intercept, or otherwise capture traffic and deliver the mirrored traffic to a monitoring fabric 104.

The production network 102 can include a production network controller 124 to manage the network. The production network controller 124 allows users, such as network administrators, to manage network operations, including network device provisioning, compliance, change management, network monitoring, and so on. An example of a production network controller is the CloudVision® network management platform developed and sold/licensed by Arista Networks, Inc. of Santa Clara, California; although it will be understood that embodiments in accordance with the present disclosure can be used in other controllers.

The monitoring fabric 104 can comprise computer systems 114 generally referred to as monitoring appliances. Examples of monitoring appliances include, but are not limited to, packet recorders, packet servicing nodes (e.g., header stripping, netflow traffic generator, etc.), packet analyzers, and so on. Fabric edge devices (filter nodes) 142 at the edge of the monitoring fabric serve as gateways for receiving monitored traffic from the production network 102 and sending received traffic into the monitoring fabric 104. The fabric switches 104a that constitute the monitoring fabric 104 can be deployed in accordance with any suitable architecture; in some embodiments, for example, the fabric switches can be configured in a mesh network.

The monitoring fabric 104 can include a monitoring fabric controller 144 to manage the monitoring fabric. The monitoring fabric controller 144 allows network managers to monitor user, device, IoT, and application traffic, record traffic, implement filters, and so on. An example of a monitoring fabric controller is Arista Networks' DANZ Monitoring Fabric (DMF™) controller, although it will be understood that embodiments in accordance with the present disclosure can be used in other network monitoring solutions.

The network deployment of FIG. 1A can include a filter agent 152 to construct and deploy user-specified traffic monitoring filters 154 to provide balanced monitoring of network traffic in accordance with the present disclosure. Briefly, in accordance with various embodiments of the present disclosure, the filter agent 152 can generate one or more rules 156 based on a user-provided traffic monitoring filter, for example, by a user, an automated system, and the like. The filter agent 152 can select one or more network devices in either the production network 102, the monitoring fabric 104, or in both networks in which to program the rules 156 to capture and deliver traffic of interest to the monitoring appliances 114. The selection of device(s) for programming can be based on criteria such as available hardware (e.g., memory for storing rules), minimizing processing load in one of the networks 102, 104, spreading the processing load across the networks 102, 104, reconfiguring the filters to accommodate changes in device utilization (e.g., TCAM capacity in a switch), switch load, and so on. In accordance with the present disclosure, the filter agent 152 can interact with the production network controller 124 and the monitoring fabric controller 144 to identify suitable devices that can be programmed in an effort to realize those criteria.

The filter agent 152 can include a suitable interface (e.g., command line interface, web interface, etc.) for interacting with a user, for example, to receive input for configuring and managing traffic filters. In some embodiments, the filter agent 152 can include a machine interface for an external automated process to configure and manage operations in the filter agent.

FIG. 1A shows that in some embodiments, the filter agent 152 can be a component (e.g., process, agent) that runs in the production network controller 124. The filter agent 152 can access various device information (state, configuration, etc.) stored in and managed by the production network controller. The monitoring fabric controller 144 can provide a suitable API (application programming interface) that allows the filter agent 152 to remotely access the monitoring fabric controller to query or otherwise access various fabric device information stored in and managed by the monitoring fabric controller. The filter agent 152 can identify one or more suitable devices (e.g. edge devices 122, 142) and configure the monitoring fabric controller to program those devices to provide balanced traffic monitoring in accordance with the present disclosure.

Figure 1B:
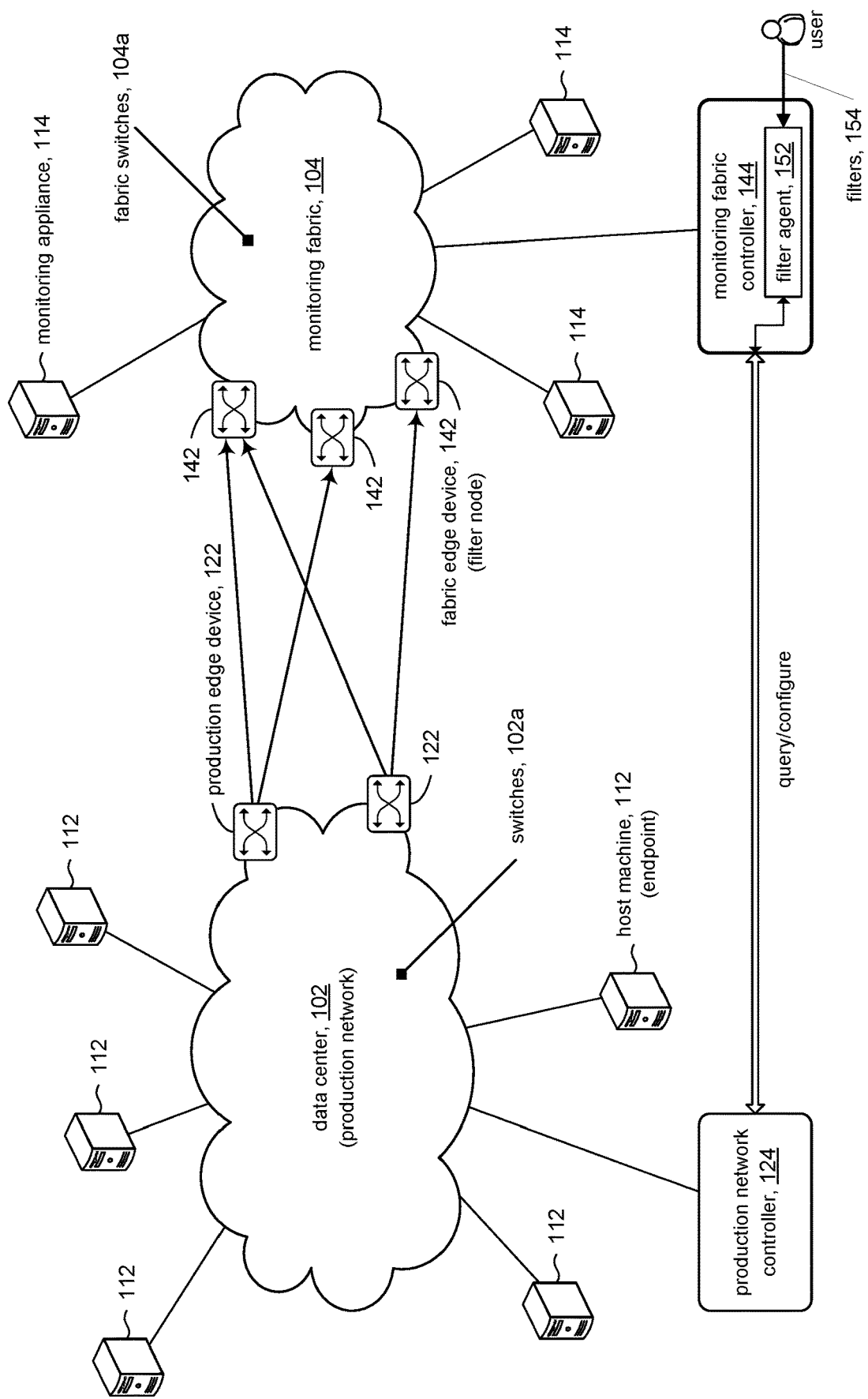

FIG. 1B shows that in some embodiments, the filter agent 152 can be a process that runs in the monitoring fabric controller 144. The filter agent 152 can access various device information stored in and managed by the monitoring fabric controller. The production network controller 124 can provide a suitable API that allows the filter agent 152 to remotely access the production network controller to query or otherwise access various network device information stored in and managed by the production network controller. The filter agent 152 can identify and configure the production network controller to program one or more suitable devices (e.g. edge devices 122, 142) to provide balanced traffic monitoring in accordance with the present disclosure.

Figure 1C:
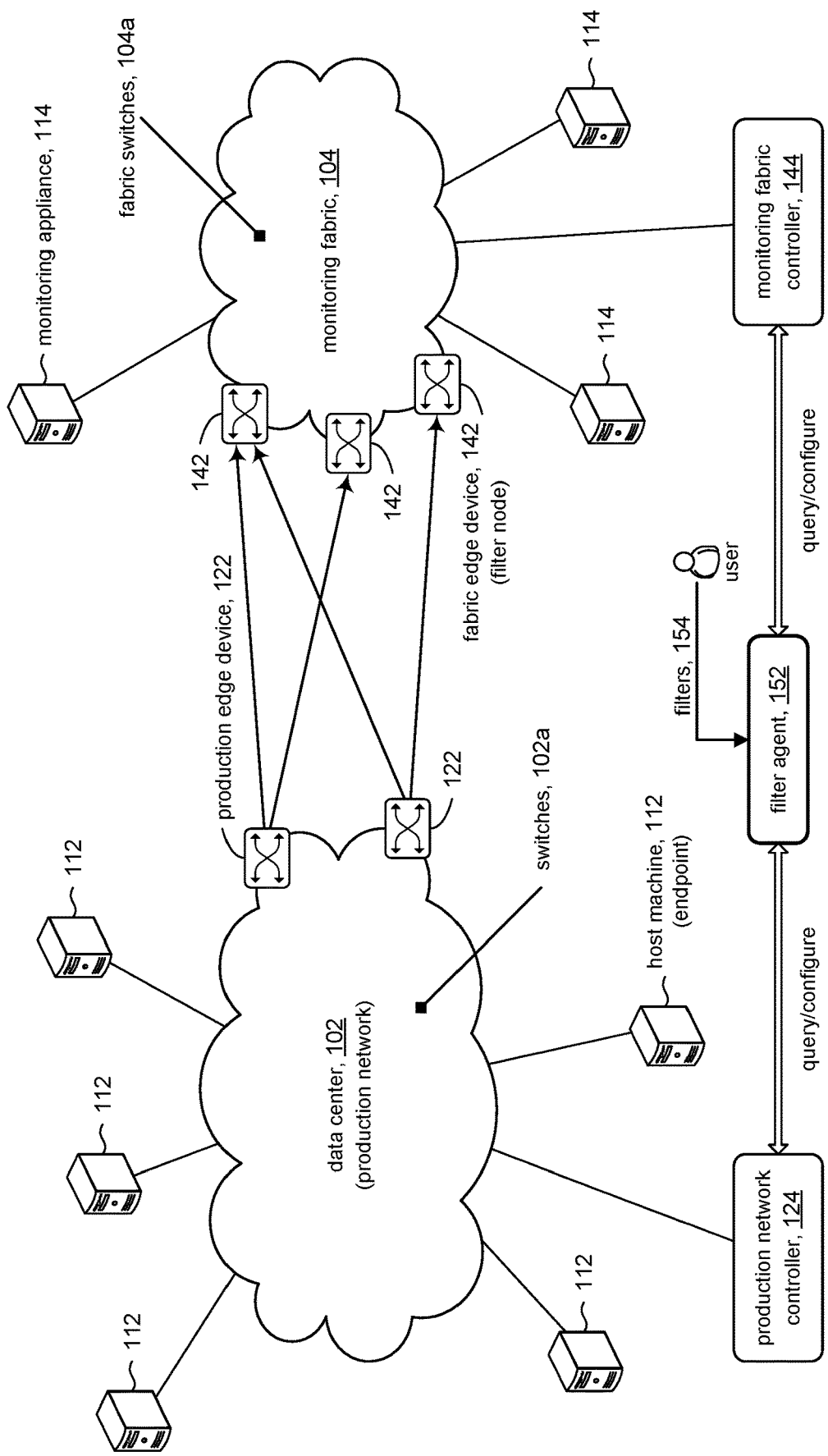

FIG. 1C shows that in some embodiments, the filter agent 152 can be a standalone component that runs on a computer system separate from the production network controller 124 and the monitoring fabric controller 144. The production network controller and the monitoring fabric controller can provide respective APIs that allow the filter agent 152 to remotely access the respective network controllers to access or otherwise query various device information stored in and managed by the production network controller and the monitoring fabric controller. The filter agent 152 can communicate with the production network controller and the monitoring fabric controller to identify and program one or more suitable devices (e.g. edge devices 122, 142) to provide balanced traffic monitoring in accordance with the present disclosure.

Figure 2A:
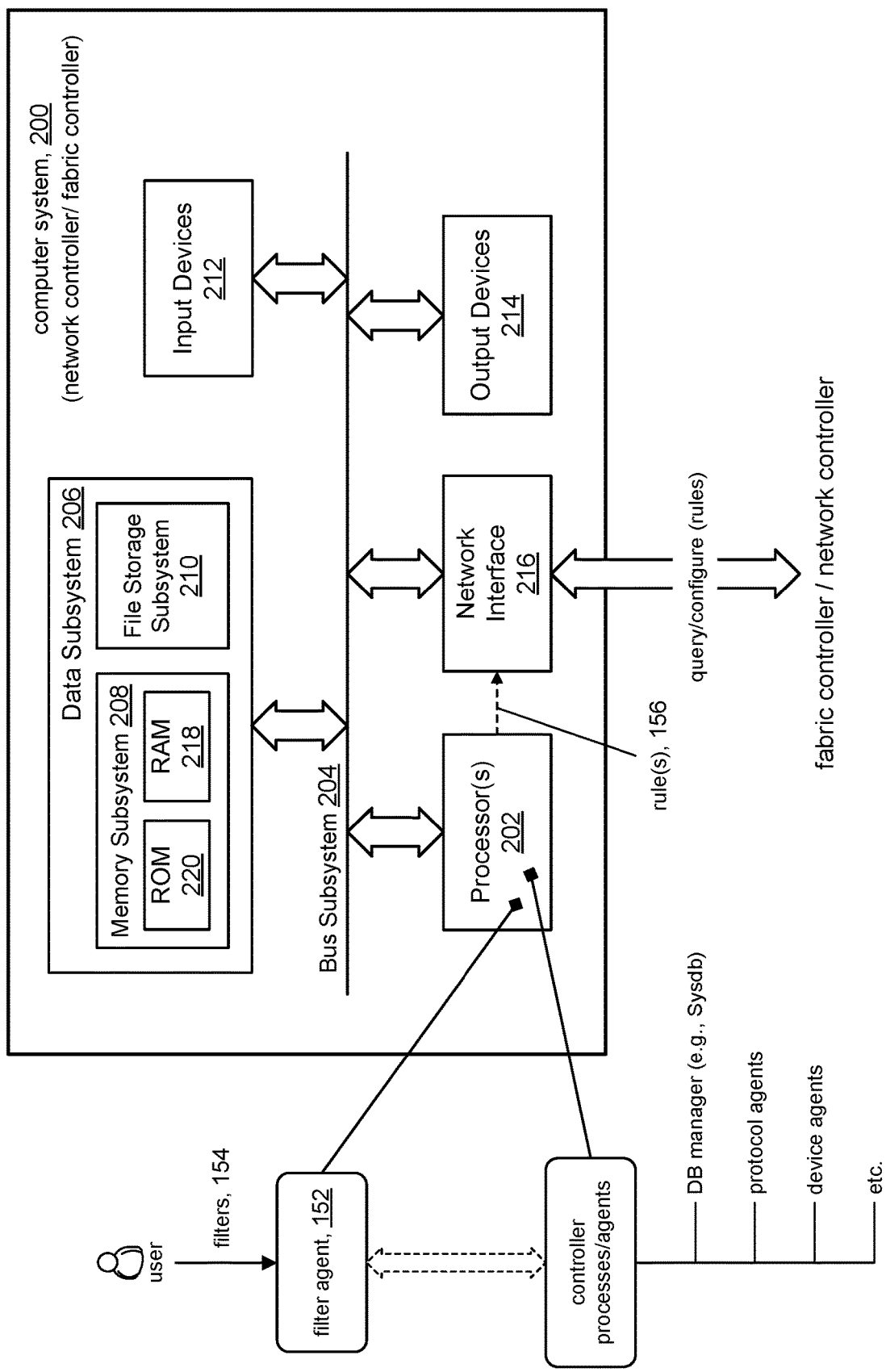
FIG. 2A shows an illustrative computing system of a controller adapted in accordance with the present disclosure.
Figure 2B:
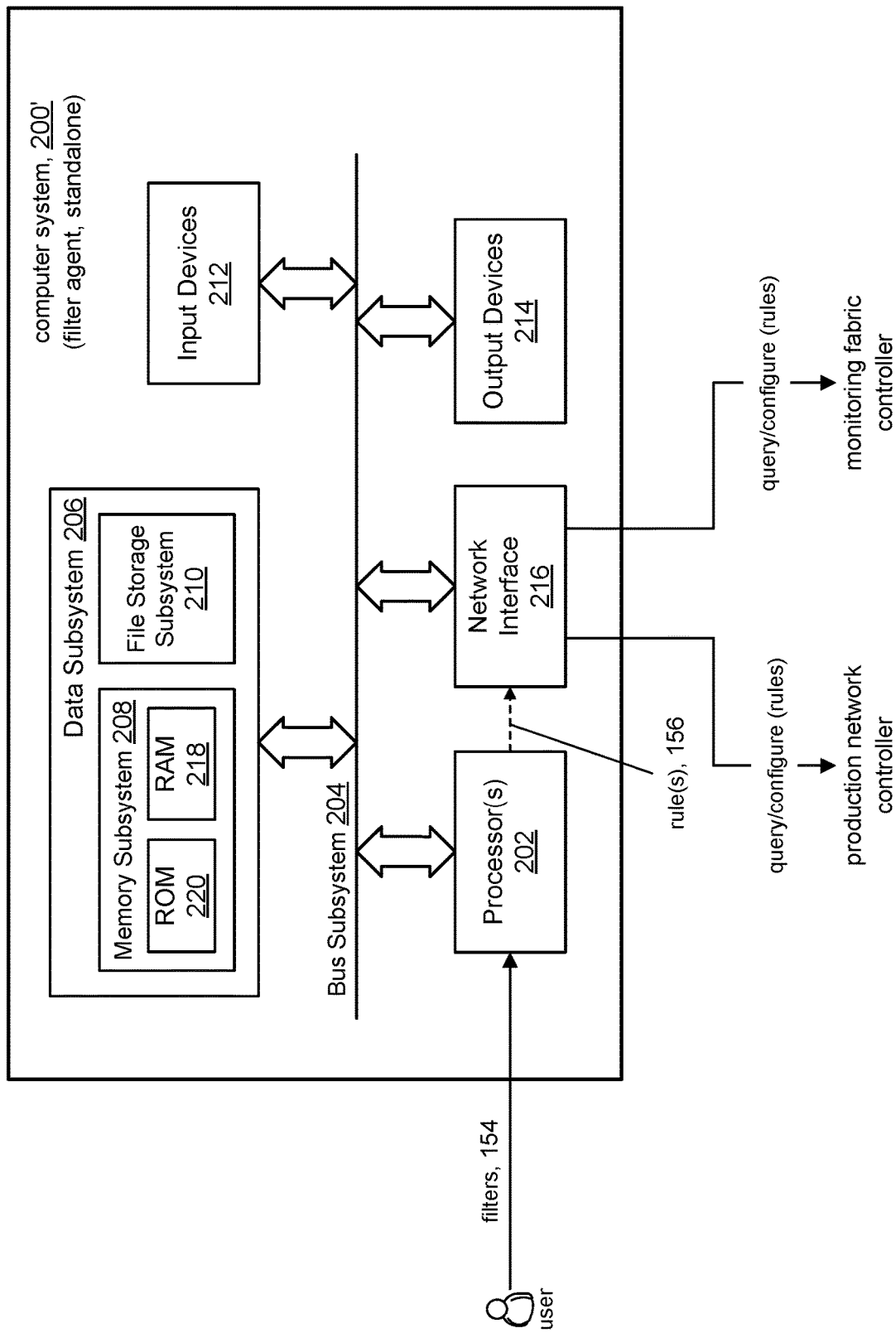
FIG. 2B shows an illustrative computing system of a filter agent in accordance with the present disclosure.

FIG. 2A depicts a simplified block diagram of an example computer system 200 according to certain embodiments. In some embodiments, for example, computer system 200 can implement a production network controller (e.g. 124) that is configured with a filter agent (e.g. 152, FIG. 1A) that runs on the production network controller to operate in accordance with the present disclosure. In other embodiments, computer system 200 can implement a monitoring fabric controller (e.g. 144) that is configured with the filter agent (e.g., FIG. 1B) that runs on the fabric controller. FIG. 2B shows an example of a computer system 200' configured as a standalone system that runs a filter agent in accordance with the present disclosure; e.g. FIG. 1C.

In some embodiments, computer system 200 (and computer system 200') includes one or more processors 202 that communicate with a number of peripheral devices via bus subsystem 204. These peripheral devices include data subsystem 206 (comprising memory subsystem 208 and file storage subsystem 210), user interface input devices 212, user interface output devices 214, and network interface subsystem 216.

Bus subsystem 204 can provide a mechanism that enables the various components and subsystems of computer system 200 (200') to communicate with each other as intended. Although bus subsystem 204 is shown schematically as a single bus, alternative embodiments of the bus subsystem can utilize multiple buses.

Network interface subsystem 216 can serve as an interface for communicating data between computer system 200 (200') and other computer systems or networks. Computer system 200 in FIG. 2A, for example, can be the production network controller shown in FIG. 1A, in which case filter agent 152 communicates with the monitoring fabric controller over network interface subsystem 216 to query the monitoring fabric controller and configure the fabric controller to program rules 156 into the fabric edge devices. Conversely, computer system 200 can be the monitoring fabric controller shown in FIG. 1B, in which case filter agent 152 communicates with the production network controller over network interface subsystem 216 to query the production network controller and configure the network controller to program rules 156 into the network devices. Likewise, computer system 200' in FIG. 2B can be a standalone filter agent, such as shown in FIG. 1C, that queries/configures the production network controller and the monitoring fabric controller over network interface subsystem 216.

User interface input devices 212 can include a keyboard, pointing devices (e.g., mouse, trackball, touchpad, etc.), a touch-screen incorporated into a display, audio input devices (e.g., voice recognition systems, microphones, etc.) and other types of input devices. In general, use of the term "input device" is intended to include all possible types of devices and mechanisms for inputting information into computer system 200 (200').

User interface output devices 214 can include a display subsystem, a printer, or non-visual displays such as audio output devices, etc. The display subsystem can be, e.g., a flat-panel device such as a liquid crystal display (LCD) or organic light-emitting diode (OLED) display. In general, use of the term "output device" is intended to include all possible types of devices and mechanisms for outputting information from computer system 200 (200').

Data subsystem 206, comprising memory subsystem 208 and file/disk storage subsystem 210, represents non-transitory computer-readable storage media that can store program code and/or data, which when executed by processor 202, can cause processor 202 to perform operations in accordance with embodiments of the present disclosure.

Memory subsystem 208 includes memory circuits such as main random access memory (RAM) 218 for storage of instructions and data during program execution and read-only memory (ROM) 220 in which fixed instructions are stored. File storage subsystem 210 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 200 (200') is illustrative and other configurations having more or fewer components are possible.

Figure 3:
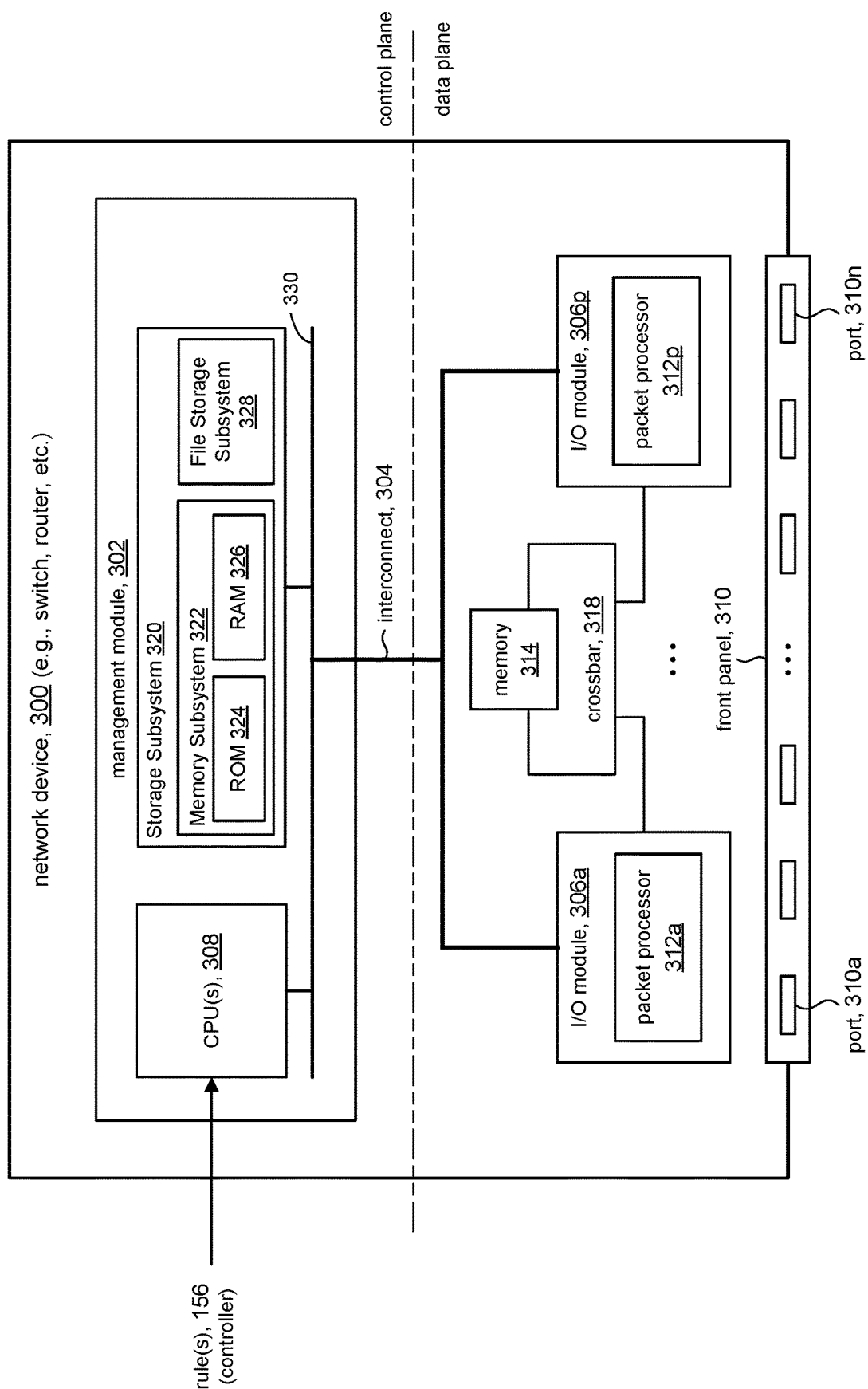
FIG. 3 shows some details of an example network device.

FIG. 3 is a schematic representation of a network device 300; e.g., edge devices 122, 142 (FIG. 1A). In some embodiments, network device 300 can include a management module 302, one or more I/O modules (switches, switch chips) 306*a*-306*p*, and a front panel 310 of I/O ports (physical interfaces, I/Fs) 310*a*-310*n*. Management module 302 can constitute the control plane of network device 300 (also referred to as a control layer or simply the CPU), and can include one or more management CPUs 308 for managing and controlling operation of network device 300 in accordance with the present disclosure. Each management CPU 308 can be a general-purpose processor, such as an Intel®/AMD® x86, ARM® microprocessor and the like, that operates under the control of software stored in a memory device/chips such as ROM (read-only memory) 324 or RAM (random-access memory) 326. The control plane provides services that include traffic management functions such as routing, security, load balancing, analysis, and the like.

The one or more management CPUs 308 can communicate with storage subsystem 320 via bus subsystem 330. Other subsystems, such as a network interface subsystem (not shown in FIG. 3), may be on bus subsystem 330. Storage subsystem 320 can include memory subsystem 322 and file/disk storage subsystem 328. Memory subsystem 322 and file/disk storage subsystem 328 represent examples of non-transitory computer-readable storage devices that can store program code and/or data, which when executed by one or more management CPUs 308, can cause one or more management CPUs 308 to perform operations in accordance with embodiments of the present disclosure; e.g., receive rules 156 generated by the filter agent and downloaded to the network device by the network controller 124 or the fabric controller 144.

Memory subsystem 322 can include a number of memories such as main RAM 326 (e.g., static RAM, dynamic RAM, etc.) for storage of instructions and data during program execution, and ROM (read-only memory) 324 on which fixed instructions and data can be stored. File storage subsystem 328 can provide persistent (i.e., non-volatile) storage for program and data files, and can include storage technologies such as solid-state drive and/or other types of storage media known in the art.

Management CPUs 308 can run a network operating system stored in storage subsystem 320. A network operating system is a specialized operating system for network device 300. For example, the network operating system can be the Arista EOS® operating system, which is a fully programmable and highly modular, Linux-based network operating system developed and sold/licensed by Arista Networks, Inc. of Santa Clara, California. It is understood that other network operating systems may be used.

Bus subsystem 330 can provide a mechanism for the various components and subsystems of management module 302 to communicate with each other as intended. Although bus subsystem 330 is shown schematically as a single bus, alternative embodiments of the bus subsystem can utilize multiple buses.

The one or more I/O modules 306*a*-306*p* can be collectively referred to as the data plane of network device 300 (also referred to as data layer, forwarding plane, etc.). Interconnect 304 represents interconnections between modules in the control plane and modules in the data plane. Interconnect 304 can be a PCIe (Peripheral Component Interconnect Express) bus or any other suitable bus architecture (e.g., SMBus (System Management Bus), I2C (Inter-Integrated Circuit), etc.).

I/O modules 306*a*-306*p* can include respective packet processing hardware comprising packet processors 312*a*-312*p* to provide packet processing and forwarding capability. Each I/O module 306*a*-306*p* can be further configured to communicate over one or more ports 310*a*-310*n* on the front panel 310 to receive and forward network traffic. Packet processors 312*a*-312*p* can comprise hardware (circuitry), including for example, data processing hardware such as an ASIC (application specific integrated circuit), FPGA (field programmable array), processing unit, and the like. Packet processors 312*a*-312*p* can include forwarding lookup hardware such as, for example, but not limited to content addressable memory such as TCAM (ternary content-addressable memory) and auxiliary memory such as SRAM (static random access memory).

Memory hardware 314 can include buffers used for queueing packets. I/O modules 306*a*-306*p* can access memory hardware 314 via crossbar 318. It is noted that in other embodiments, the memory hardware 314 can be incorporated into each I/O module. The forwarding hardware in conjunction with the lookup hardware can provide wire speed decisions on how to process ingress packets and outgoing packets for egress.

Figure 4:
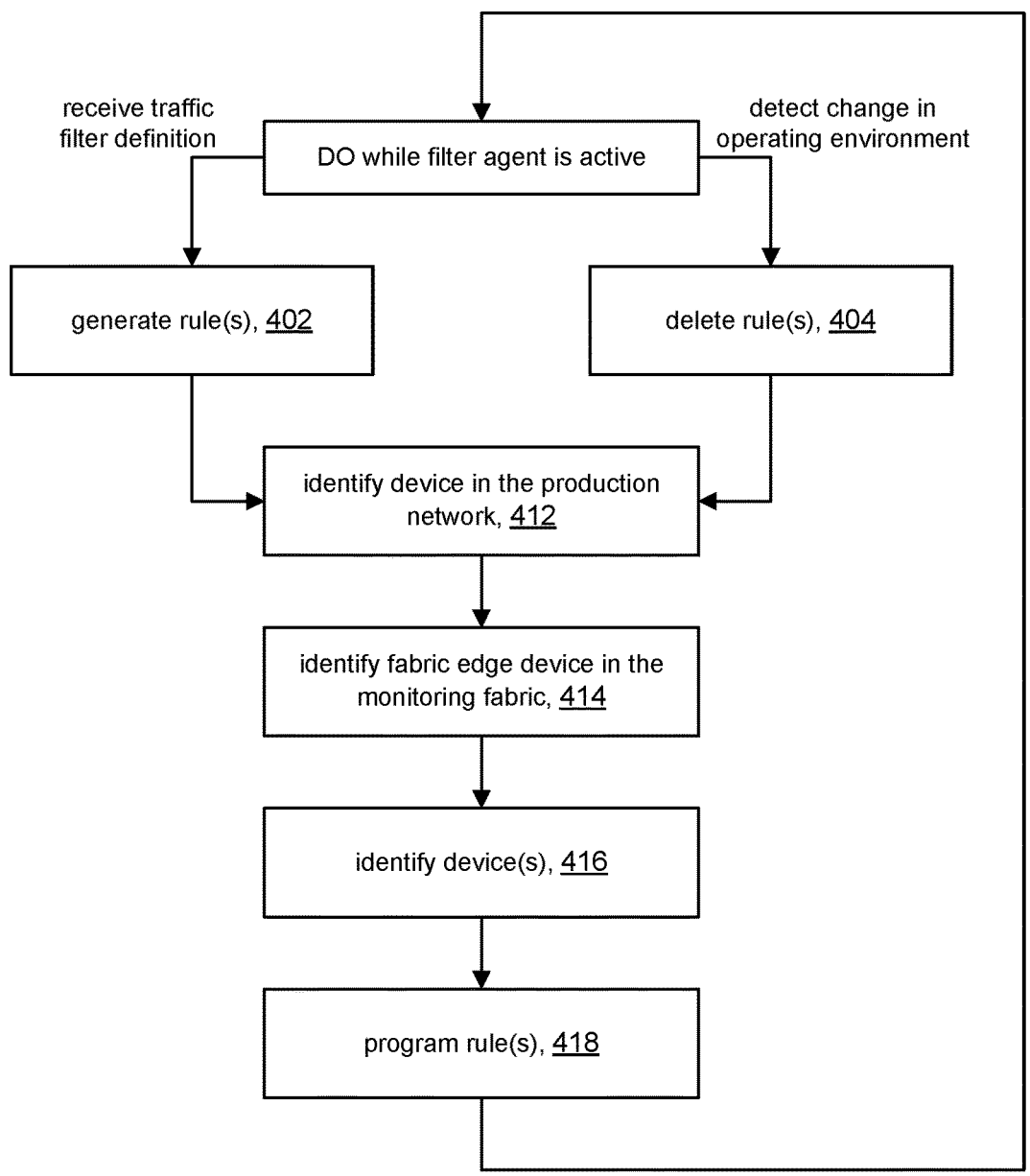
FIG. 4 shows processing of a filter agent in accordance with the present disclosure.

Referring to FIG. 4, the discussion will now turn to a high level description of processing in a filter agent (e.g., 152) to provide balanced traffic monitoring in accordance with the present disclosure. In some embodiments, for example, the filter agent can include computer executable program code (e.g., stored on a non-transitory computer-readable storage memory device), which when executed by a processor (e.g., 202, FIG. 2A), causes the computer system to perform processing in accordance with FIG. 4. The operation and processing blocks described below are not necessarily executed in the order shown. Operations can be combined or broken out into smaller operations in various embodiments. Operations can be allocated for execution among one or more concurrently executing processes and/or threads.

As shown in FIG. 4, in some embodiments, the filter agent can operate in a loop to monitor for activity such as input received from a user or an indication of changes in the operating environment.

Receive User Configuration

At operation 402, the filter agent can generate one or more rules (e.g., 156, FIG. 2A) that constitute a user-specified traffic monitoring filter (154). In some embodiments, the filter agent can receive input from a user to define, create or otherwise configure a traffic monitoring filter to capture traffic of interest. For example, the user can provide their input via a suitable user interface (e.g., a CLI) or by downloading a configuration file, and so on. The user input can specify match criteria that specify the traffic of interest, and one or more actions to perform on the traffic of interest. The action can be to forward matched packets to monitoring appliances in the monitoring fabric.

Figure 5:
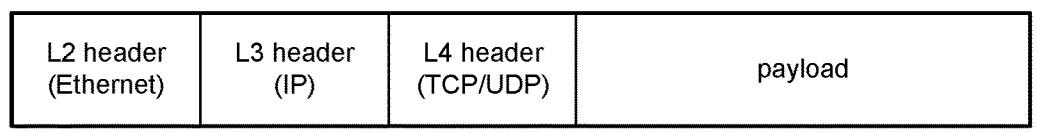
FIG. 5 shows the format of an illustrative data packet.

The traffic of interest refers to a subset of the network traffic in the production network that the user is interested in capturing; e.g., to investigate security concerns, troubleshoot performance application/device issues, etc. The traffic of interest can be specified by identifying the data packets that constitute the traffic of interest. For example, data packets can be identified based on the content in their headers. Referring for a moment to FIG. 5, a data packet can comprise one or more L2 (Layer 2), L3 (Layer 3), and L4 (Layer 4) headers. An L2 header comprises data fields including the source and destination MAC addresses and protocol type (IPv4, IPv6). An L3 header comprises data fields including the source and destination IP addresses and protocol number. An L4 header includes data fields such as TCP (transmission control protocol) and UDP (user datagram protocol) headers, but can be other protocol headers. It will be appreciated that data packets can be identified based on search criteria other than or in addition to the packet headers, such as content in the payload, the ingress port on which the packet was received, and so on.

Traffic filters can be used when a user wants to monitor a specific application. The user can configure rules so that the monitored traffic relates to the desired application. Merely to illustrate, the following example of a traffic filter:

web app IP+TCP port 443 specifies flows for a specific web application. As another example, the traffic filter:

SIP server IP+TCP/UDP ports (5060, 5061)

specifies VOIP (voice over IP) control flows.

At operation 412, the filter agent can identify one or more network devices in the production network as a candidate device in which to program the generated rule(s). In some embodiments, for example, the filter agent can interact with the production network controller (e.g., 124) to obtain or otherwise generate topology information of the production network. In a configuration such as shown in FIG. 1A, where the filter agent is a component (e.g., process) running on the production network controller, the filter agent can communicate directly with other processes/agents running on the production network controller. In a configuration such as shown in FIG. 1B or FIG. 1C, where the filter agent is outside of the production network controller, the production network controller can provide an API that allows the filter agent to query the processes/agents running on the production network controller.

Using the topology information, the filter agent can identify an endpoint device in the production network that carries the user-specified traffic of interest. The endpoint device represents a candidate device in which to program one or more of the generated rules that constitute the filter.

At operation 414, the filter agent can interact with the fabric controller (e.g., 144) to identify a fabric edge device (e.g., 142) at the edge of the monitoring fabric as another candidate in which to program the generated filter(s). In a configuration such as shown in FIG. 1B, where the filter agent is a process that runs on the fabric controller, the filter agent can communicate directly with other processes/agents running on the fabric controller. In a configuration such as shown in FIG. 1A or FIG. 1C, where the filter agent is outside of the fabric controller, the fabric controller can provide an API that allows the filter agent to query the fabric controller.

In some embodiments, a candidate device can be selected based on:
- whether the device is user configurable; e.g., whether the filter agent can configure rules;
- the production network controller can provide topology information to figure out the links between the production network and the monitoring fabric; candidate devices can be devices on the monitoring fabric that have links to the production network can be At operation 416, the filter agent can select one or more devices among candidate device(s) to be programmed with the rule(s) that constitute the traffic monitoring filter. The rule(s) can be programmed in either the identified production network device or fabric edge device, or in both the identified production network device and fabric edge device. In some embodiments, for example, the filter agent can determine which device to program based on various criteria that can be obtained from the production network controller and the monitoring fabric controller:

- Capability and/or resources in the identified production network and monitoring fabric devices. For example, a device may not have the capability to match on certain fields in the data packet such as the UDP header, and the like. A device may not have sufficient hardware resources (e.g., storage in content-addressable memory) to store the filter, or the capability may not be implemented, the capability may conflict with other features, and so on.
- Device permission-Production devices may have restrictions, user-imposed or otherwise, on who can create new rules; e.g., whether or not the filter agent is permitted (e.g., has correct authorization) to configure new rules in the device.
- Preference can be given to programming the production network device over programming the fabric edge device. For example, a monitoring fabric typically is not configured with the same level of performance (e.g., bandwidth) as the production network. Programming filters on the production side rather than on the monitoring fabric can reduce the expected volume of mirrored traffic that the monitoring fabric has to process. Also, having the filters on the production network side can reduce load on the production network side because less traffic is transmitted to the monitoring fabric.

If both the identified production network device and the fabric edge device are suitable candidates for programming the rule(s), preference can be to program the rules(s) in the production network device.

In some use cases, a traffic policy can be enforced in more than one production-side device. For example, the policy may be generic so that the rules need to be installed in multiple devices. In the case of an MLAG (multi-chassis link aggregation), the rules would be installed in both switches that constitute the MLAG. If the captured traffic is transmitted using ECMP (equal cost multiple path) routing, the rules would be programmed in each switch in the ECMP group.

In some instances, a traffic filter may comprise several rules. It may be suitable to program some rules that constitute the filter in the production network device and other rules of the filter in the fabric edge device.

At operation 418, the filter agent can program the selected device(s). In some embodiments, the filter agent can communicate with the production network controller and/or the monitoring fabric controller to program the device. In a configuration where the filter agent is a process that runs on the production network controller and:

- if the selected device is in the production network, the filter agent can interact directly with processes/agents running on the network controller to cause the network controller to program the rule(s) in the device.
- if the selected device is a fabric edge device on the monitoring fabric, the filter agent can communicate with the fabric monitoring controller via an API to initiate programming of, or otherwise cause, the rule(s) to be programmed in the fabric edge device by the fabric controller.

Conversely, in a Configuration where the Filter Agent is a Process that Runs on the Fabric Controller and:

- if the selected device is in the production network, the filter agent can communicate with the production network controller via an API to initiate programming of, or otherwise cause, the rule(s) to be programmed in the production network device by the network controller.
- if the selected device is on the monitoring fabric, the filter agent can interact directly with processes/agents running on the fabric controller to cause the fabric controller to program the rule(s) in the device.

In a configuration where the filter agent runs on a computer system separate from the network controller and the fabric controller, the filter agent can communicate via a corresponding API to program the rule(s) in the device. Processing can return to the top of the loop.

Detect Change in Operating Environment

In the case of detecting a change in the operating environment, the filter agent can redeploy one or more previously programmed rules in order to accommodate the change. In some embodiments, for example, the production network controller and the monitoring fabric controller can monitor the network devices deployed in their respective networks. When a controller detects a change, the controller can signal the filter agent. In other embodiments, the filter agent can poll the production network controller and/or the monitoring fabric controller for any changes. In some embodiments, for example, redeployment of one or more previously programmed rules can be triggered when a switch (either a production switch or a fabric switch) is decommissioned or has failed. Redeployment can be triggered when an end host moves from one switch to another. Configuration changes in a switch (production or fabric) may trigger redeployment; e.g., if someone resets the running configuration of a production switch. Redeployment can be triggered when utilization in a device exceeds a threshold. For example, suppose a rule is programmed in a filter edge device because resource utilization in the production network device was too high. If at a later time, resource utilization in the production network device has fallen below a threshold, then it may be desirable to move the rule from the filter edge device to the production network device.

At operation 404, the filter agent can delete rules for a traffic filter that were previously programmed (e.g., from operation 418) in a device whose level of utilization has changed. The deleted rules can then be moved to another device. Accordingly, processing can proceed according to operations 412-418 to identify candidates for redeploying the deleted rules. In some embodiments, the following heuristic can be applied: If the programmed device is a production device, then the rules can be redeployed on a fabric edge device. Conversely, if the programmed device is a fabric edge device, then the rules can be redeployed on a suitable device in the production network, namely a device that carries the traffic of interest.

Further Examples

Features described above as well as those claimed below may be combined in various ways without departing from the scope hereof. The following examples illustrate some possible, non-limiting combinations:

(A1) A method in a filter agent to monitor network traffic in a production network, the method comprising the filter agent: receiving input that specifies traffic in the production network to be monitored; generating at least one rule to match the specified traffic; interacting with a network controller of the production network to identify one or more network devices in the production network on which to program the at least one rule, identification of the one or more network devices by the filter agent being based at least on: the network device having a capability to capture the specified traffic; the network device having available resources to program the at least one rule; and the network device having permission to program the at least one rule; in response to successfully identifying a network device in the production network on which to program the at least one rule, programming the at least one rule on the identified network device, wherein production network traffic through the identified network device is filtered according to the at least one rule to obtain the specified traffic from the traffic and the specified traffic is forwarded to a monitoring fabric; and in response to failing to identify a network device in the production network on which to program the at least one rule, interacting with a fabric controller of the monitoring fabric to identify an edge device in the monitoring fabric on which to program the at least one rule and programming the at least one rule on the fabric edge device, wherein production network traffic received by the fabric edge device is filtered according to the at least one rule to obtain the specified traffic from the traffic and the specified traffic is forwarded to the monitoring fabric.

(A2) For the method denoted as (A1), the filter agent is a process that runs either in the network controller of the production network or in the fabric controller of the monitoring fabric.

(A3) For the method denoted as any of (A1) through (A2), the filter agent runs on a computer system separate from both the network controller of the production network and the fabric controller of the monitoring fabric.

(A4) For the method denoted as any of (A1) through (A3), programming the at least one rule on the identified network device includes interacting with the network controller of the production network to program the at least one rule on the identified network device.

(A5) For the method denoted as any of (A1) through (A4), programming the at least one rule on the fabric edge device includes interacting with the fabric controller of the monitoring fabric to program the at least one rule on the fabric edge device.

(A6) The method denoted as any of (A1) through (A5), further comprising redeploying the at least one rule from a first network device on which the at least one rule is programmed to a second network device in response to detecting a change in operating conditions in the first network device.

(A7) For the method denoted as any of (A1) through (A6), wherein the first network device is a device in the production network and the second network device is in the monitoring fabric.

(A8) For the method denoted as any of (A1) through (A7), the first network device is a device in the monitoring fabric and the second network device is a device in the production network.

(A9) The method denoted as any of (A1) through (A8), further comprising, in response to successfully identifying both a first network device in the production network and a second network device in the monitoring network on which to program the at least one rule, programming the at least one rule on the first network device in preference over the second network device.

(B1) A computer system comprising: one or more computer processors; and a computer-readable storage device comprising instructions for controlling the one or more computer processors to: receive a traffic monitoring filter; generate at least one rule based on the traffic monitoring filter, wherein the at least one rule matches on a subset of traffic flow in a production network and designates an action to send a copy of the subset of traffic to a monitoring fabric; communicate with a network controller of the production network to identify a (first) network device in the production network on which to program the at least one rule; communicate with a fabric controller of the monitoring fabric to identify a (second) network device in the monitoring fabric on which to program the at least one rule; program one or more of the first and the second network device with the at least one rule based on configurations of the first network device and the second network device.

(B2) For the computer system denoted as (B1), the computer-readable storage device further comprises instructions for controlling the one or more computer processors to: generate a first rule and a second rule from the traffic monitoring filter; program the first rule on the first network device; and program the second rule on the second network device.

(B3) For the computer system denoted as any of (B1) through (B2), the computer system is separate from a computer system that comprises the network controller, wherein the computer-readable storage device further comprises instructions for controlling the one or more computer processors to communicate with the network controller using an application programming interface (API).

(B4) For the computer system denoted as any of (B1) through (B3), the computer system is separate from a computer system that comprises the fabric controller, wherein the computer-readable storage device further comprises instructions for controlling the one or more computer processors to communicate with the fabric controller using an API.

(B5) For the computer system denoted as any of (B1) through (B4), the computer system is separate from both the network controller and the fabric controller.

(B6) For the computer system denoted as any of (B1) through (B5), the computer system communicates with the network controller to program the first network device.

(B7) For the computer system denoted as any of (B1) through (B6), the computer system communicates with the fabric controller to program the second network device.

(B8) For the computer system denoted as any of (B1) through (B7), the computer-readable storage device further comprises instructions that control the one or more computer processors to redeploy the at least one rule between the first network device and the second network device in response to detecting a change in operating conditions in the first or second network device.

(C1) A method in a filter agent to monitor network traffic in a production network, the method comprising the filter agent: receiving a traffic monitoring filter; generating at least one rule based on the traffic monitoring filter, wherein the at least one rule matches on a subset of traffic flow in a production network and designates an action to send a copy of the subset of traffic to a monitoring fabric; communicating with a network controller of the production network to identify a (first) network device in the production network on which to program the at least one rule; communicating with a fabric controller of the monitoring fabric to identify a (second) network device in the monitoring fabric on which to program the at least one rule; and programming the at least one rule on the first or the second network device depending on configurations of the first network device and the second network device.

(C2) For the method denoted as (C1), the filter agent is a process that runs on the network controller of the production network and communicates with the fabric controller using an API.

(C3) For the method denoted as any of (C1) through (C2), the filter agent is a process that runs on the fabric controller and communicates with the network controller using an API.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

The invention claimed is:

1. A method in a filter agent to monitor network traffic in a production network, the method comprising:
   receiving input that specifies traffic in the production network to be monitored;
   generating at least one rule to match the specified traffic;
   interacting with a network controller of the production network and attempting to identify, based on the interacting with the network controller, one or more network devices in the production network on which to program the at least one rule, wherein the attempting to identify the one or more network devices is performed using topology information of the production network that is received from the network controller and is based at least on:
      the one or more network devices having a capability to capture the specified traffic;
      the one or more network devices having available resources to program the at least one rule; and
      the one or more network devices having permission to program the at least one rule;
   in response to successfully identifying a network device in the production network on which to program the at least one rule, programming the at least one rule on the identified network device, wherein production network traffic through the identified network device is filtered according to the at least one rule to obtain the specified traffic from the traffic and the specified traffic is forwarded to a monitoring fabric; and
   in response to failing to identify a network device in the production network on which to program the at least one rule, interacting with a fabric controller of the monitoring fabric, identifying, based on the interacting with the fabric controller, an edge device in the monitoring fabric on which to program the at least one rule, and programming the at least one rule on the fabric edge device, wherein production network traffic received by the fabric edge device is filtered according to the at least one rule to obtain the specified traffic from the traffic and the specified traffic is forwarded to the monitoring fabric.

2. The method of claim 1, wherein the filter agent is a process that runs either in the network controller of the production network or in the fabric controller of the monitoring fabric.

3. The method of claim 1, wherein the filter agent runs on a computer system separate from both the network controller of the production network and the fabric controller of the monitoring fabric.

4. The method of claim 1, wherein programming the at least one rule on the identified network device includes interacting with the network controller of the production network to program the at least one rule on the identified network device.

5. The method of claim 1, wherein programming the at least one rule on the fabric edge device includes interacting with the fabric controller of the monitoring fabric to program the at least one rule on the fabric edge device.

6. The method of claim 1, further comprising redeploying the at least one rule from a first network device on which the at least one rule is programmed to a second network device in response to detecting a change in operating conditions in the first network device.

7. The method of claim 6, wherein the first network device is a device in the production network and the second network device is in the monitoring fabric.

8. The method of claim 6, wherein the first network device is a device in the monitoring fabric and the second network device is a device in the production network.

9. The method of claim 1, further comprising, in response to successfully identifying both a first network device in the production network and a second network device in the monitoring fabric on which to program the at least one rule, programming the at least one rule on the first network device in preference over the second network device.

10. A computer system comprising:
    one or more computer processors; and
    a computer-readable storage device comprising instructions for controlling the one or more computer processors to:
       receive a traffic monitoring filter;
       generate at least one rule based on the traffic monitoring filter, wherein the at least one rule matches on a subset of traffic flows in a production network and designates an action to send a copy of the subset of traffic to a monitoring fabric;
       communicate with a network controller of the production network and identify, based on topology information of the production network that is received from the network controller, a first network device in the production network on which to program the at least one rule;
       communicate with a fabric controller of the monitoring fabric and identify, based on the communicating with the fabric controller, a second network device in the monitoring fabric on which to program the at least one rule; and
       program one or more of the first and the second network device with the at least one rule based on configurations of the first network device and the second network device.

11. The computer system of claim 10, wherein the computer-readable storage device further comprises instructions for controlling the one or more computer processors to:
    generate a first rule and a second rule from the traffic monitoring filter;
    program the first rule on the first network device; and
    program the second rule on the second network device.

12. The computer system of claim 10, wherein the computer system is separate from a computer system that comprises the network controller, wherein the computer-readable storage device further comprises instructions for controlling the one or more computer processors to communicate with the network controller using an application programming interface (API).

13. The computer system of claim 10, wherein the computer system is separate from a computer system that comprises the fabric controller, wherein the computer-readable storage device further comprises instructions for controlling the one or more computer processors to communicate with the fabric controller using an API.

14. The computer system of claim 10, wherein the computer system is separate from both the network controller and the fabric controller.

15. The computer system of claim 10, wherein the computer system communicates with the network controller to program the first network device.

16. The computer system of claim 10, wherein the computer system communicates with the fabric controller to program the second network device.

17. The computer system of claim 10, wherein the computer-readable storage device further comprises instructions that control the one or more computer processors to redeploy the at least one rule between the first network device and the second network device in response to detecting a change in operating conditions in the first or second network device.

18. A method in a filter agent to monitor network traffic in a production network, the method comprising:

receiving a traffic monitoring filter;

generating at least one rule based on the traffic monitoring filter, wherein the at least one rule matches on a subset of traffic flows in a production network and designates an action to send a copy of the subset of traffic to a monitoring fabric;

communicating with a network controller of the production network and identifying, based on topology information of the production network that is received from the network controller, a first network device in the production network on which to program the at least one rule;

communicating with a fabric controller of the monitoring fabric and identifying, based on the communicating with the fabric controller, a second network device in the monitoring fabric on which to program the at least one rule; and programming the at least one rule on the first or the second network device depending on configurations of the first network device and the second network device.

19. The method of claim 18, wherein the filter agent is a process that runs on the network controller and communicates with the fabric controller using an application programming interface (API).

20. The method of claim 18, wherein the filter agent is a process that runs on the fabric controller and communicates with the network controller using an API.

* * * * *